United States Patent [19]
Cotton, Jr.

[11] 3,984,221
[45] Oct. 5, 1976

[54] ELONGATED RETAINER STRIPS FOR FIBROUS FILTER BATTS

[75] Inventor: Worth Bagley Cotton, Jr., Greensboro, N.C.

[73] Assignee: Industrial Air, Inc., Greensboro, N.C.

[22] Filed: Sept. 25, 1975

[21] Appl. No.: 616,687

[52] U.S. Cl. .................................. 55/501; 55/484; 55/511
[51] Int. Cl.² ....................................... B01D 25/04
[58] Field of Search ............ 55/501, 500, 511, 484; 160/371, 382

[56] References Cited
UNITED STATES PATENTS

| | | | |
|---|---|---|---|
| 3,373,546 | 3/1968 | Setnan | 55/501 |
| 3,470,680 | 10/1969 | Avera | 55/511 |

FOREIGN PATENTS OR APPLICATIONS

| | | | |
|---|---|---|---|
| 998,146 | 7/1965 | United Kingdom | 55/495 |

*Primary Examiner*—Bernard Nozick

[57] ABSTRACT

An elongated, generally U-shaped in cross-section, retainer strip, of the type which includes longitudinally extending, resilient, confronting semi-walls extending inwardly and downwardly from the free ends of the legs to grip the edges of a fibrous filter mat, includes a pair of exterior flanges. One exterior flange extends in spaced, parallel relation to one of the walls of the retainer strip to mount the retainer strip on a planar portion of a filter frame without rivets or cement. The other exterior flange extends in spaced, parallel relation to another wall of the retainer strip to secure the edges of a conventional screen or mesh backing member eliminating sheet metal tabs.

2 Claims, 3 Drawing Figures

ELONGATED RETAINER STRIPS FOR FIBROUS FILTER BATTS

BACKGROUND OF THE INVENTION

In the manufacture of rectangular filter frames and air filter cells of a V-configuration, a sheet of heavy gauge, wire screen backing is generally secured by sheet metal tabs to the filter frame. A retainer strip is then secured to the frame in some manner such as by riveting or cementing, and an overlying, fibrous filter batt or mat is applied to the retainer strip. The filter mat overlies the wire screen backing to act as a primary filtering media for the incoming air stream. Because these fibrous filter mats must be frequently changed or removed for cleaning purposes, it became necessary to devise an efficient means for easily securing them to and removing them from the structural frames.

To that end, eforts have been made to facilitate the assembly, such as exemplified in the U.S. Pat. to Donachine No. 3,293,834, which discloses a retainer strip having a pair of inwardly and downwardly turned semi-walls which form a slotted front wall into which the edes of the filter mat are secured. In another U.S. Pat. No. 3,470,680, a V-shaped air filter cell utilizes retaning strips having a slotted front wall for gripping the filter mat and a flanged rear wall for securing the retainer strip to the hardware frame. In yet a further U.S. Pat. No. 3,373,546, a specially extruded frame grips a cooperating portion of the retainer strip, but this is very expensive and not easily adapted to V-configuration filter cells.

while the above named patents represent significant advances in the construction of air filtr cells, there are still disadvantages in construction technique which directly affect the overall operation thereof. One major problem in the construction of rectangular and V-cell filter cells is the necessity for riveting, welding or other sheet metal techniques to secure the structural elements together. In securing the wire screen to the metal frame, it is conventional to form tabs on the frame portion which are bent around the wire mesh to secure it in place. The result is that workmen frequently injure their hands on the metal parts while trying to erect the cells, not only while securing the screen, but also while subsequently working with the fibrous batt thereafter. Further, assembly of the screen and retaining strip to the frame are time consuming, thereby increasing costs.

SUMMARY OF THE INVENTION

The present invention is directed to an improved gripping or retaining strip having, in addition to the slotted front wall which grips the fibrous mat, a first flange extending in parallel relationship to the wall opposite the slotted wall and a second flange extending in parallel relationship to one of the side walls. One of the aforementioned flanges releasably grips the periphery of the screen, while the other flange releasably grips planar portions of the frame. Therefore the retaining strip, according to the present invention serves three functions: holds the fibrous mat, retains the screen, and secures the mat and screen to the frame without rivets, tabs, or other bonding means. It is further very compatible with exisitng frame structures and requires no specially constructed or extruded frame members.

The retaining strip itself comprises a base wall, a pair of depending side walls, and a slotted wall opposite the base wall, the aforementioned walls forming a main channel into which the fibrous filter mat is releasably secured in accordance with known means. A first auxiliary wall or flange is secured at one end to one side or edge of the base wall and extends adjacent to and spaced slightly therefrom in parallel relationship. This first auxiliary wall or flange and the base wall form a narrow, longitudinallly extending trackway into which the periphery of the screen mesh or a flat portion of the metallic frame is secured by a gripping action between the base wall and the flange. A second auxiliary wall or flange depends in a similar manner from one of the side walls to form a second longitudinally extending trackway. This second trackway secures the other of the screen mesh or flange, so that one of the trackways provides a gripping means for the screen while the othr provides a gripping means for holding the retaining strip onto the frame.

It is therefore an object of the present invention to provide an improved, elongated retaining strip for securing the elements of a filter cell together without riveting or welding.

Another object of the present invention is to provide an improved retaining strip for air filter cells that is more easily and economically installed and requires no specially extended frame members.

Additional objects and advantages of the present invention will become obvious to those skilled in the art when the following detailed description is studied in conjunction with the accompanying drawings, in which.

DETAILED DESCRIPTION OF THE PREFERRED EMBODIMENT

Figure 1:
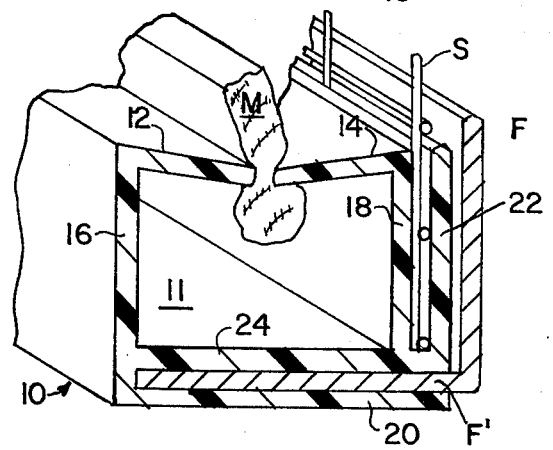
FIG. 1 is a perspective view, partially in section, illustrating the manner in which the retaining strip according to the present invention secures the elements of a filter cell together.

Turning now to the accompanying drawings, and in particular to FIG. 1, there is illustrated the retaining strip 10 according to the present invention which is generally U-shaped in cross-section and includes a pair of elongated, resilient, confronting angularly disposed semi-walls 12,14, extending inwadly and downwardly from the free ends of the legs or side walls 16,18 to provide a slotted wall into which is secured the edge of a sheet of fibrous filter media F. Retainer strip 10 further includes a pair of exterior flanges 20,22, one of which extends in spaced, parallel relation to the base 24 of the retainer strip 10 to mount the retainer strip on a planar portion f′ of the filter frame F. The other exterior flange 22 extends in spaced, parallel relation from one of side walls 16,18 and forms a trackway therebetween into which is received the peripheral edge of the conventional wire screen backing S.

In more detail, the retainer strip 10 forms a channel 11 defined by opposing side walls 16,18, base wall 24, and a slotted front wall comprising downwardly and inwardly depending, resilient semi-walls 12,14 which extend obliquely from the free ends of side walls 16,18, and terminate in spced relation to form a slot into which one edge of the filter mat M is inserted. Either before or after erection of the filter cell, the edges of the fibrous mat M are positioned by means of a small hand tool through the slot between the semi-walls 12,14. Because the material thickness of the fibrous mat M is greater than that of the slot between semi-walls 12,14, the edges of the slot grasp the mat M and prevent its slipping out. Additionally, the flexibility of the semi-walls and the inwardly raked obtuse angle therebetween will cause a narrowing of the slot if the mat is pulled outwardly from the slot, thus causing a tighter gripping of the mat.

An extension of the base wall 24 extends outwardly past side wall 18 and is turned upwardly to form an auxiliary wall or flange 22, which extends in parallel spaced position to side wall 18. It should be recognized that the flange 22 could extend from the opposite side wall 16 if desired. The space between wall 18 and flange 22 form a trackway which receives and secures the edges of the wire/screen S. The space which defines the trackway between side wall 18 and flange 22 is less than the thickness of the edge of the screen, however the slight flexibility of the wall 18 and flange 22 allow the edges of the screen to be slipped into the trackway and tightly secured therein by a gripping action of the wall.

A second trackway is defined in a similar manner by a second flange or auxiliary wall 20 which is formed by a continuation of side wall 16 downward a slight distance and then turned sideways to form the flange 20 in spaced, parallel relation to base wall 24. This second trackway has the same gripping capabilities as the aforementioned trackway, and receives and grippingly secures a planar portion $f'$ of the filter frame F.

Figure 2:
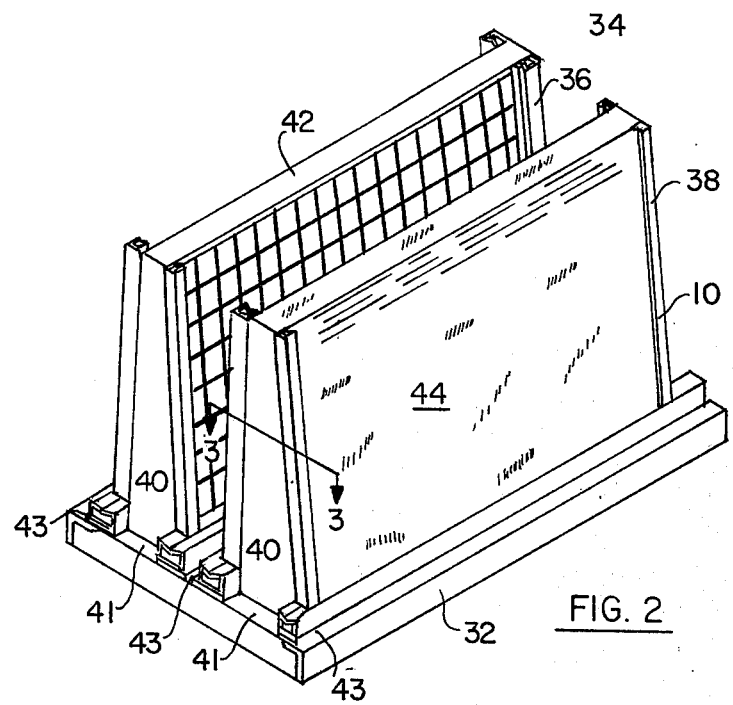
FIG. 2 is a perspective view of a dual-cell, V-configuration filter arrangement illustrating the manner in which the retaining strip of the present invention may be used.
Figure 3:
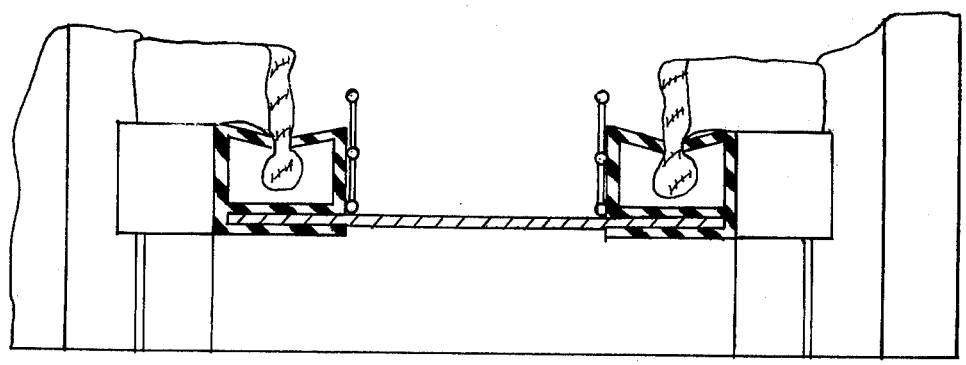
FIG. 3 is an enlarged cross-sectional view taken substantially along lines 3—3 of FIG. 2.

Turning now to FIGS. 2 and 3, there is illustrated a dual-cell, V-configuration filter unit 30 which utilizes a plurality of retainer strips 10 of the present invention. The V-configuraton filter cell 30 includes primarily a rectangular frame structure 32 that surrounds and supports the entire unit: a heavy gauge, wire screening member 34 which is formed by bending wire mesh into one or more V-shaped screen cells 36,38; sheet metal end caps 40 covering opposite open sides of the filter screen 34 and extending upwardly from the rectangular structural frame 32; top caps 42; and an overlying fibrous filter mat 44 which traps impurities from the air stream. Conventional retainer strips 10' without exterior flanges are located horizontally across structural frame 32 to retain the ends of filter mat 40. Retainer strips 10, as illustrated in FIG. 1, are arranged vertically along the edges of end caps 40 to retain the side edges of screen 34 and the side edges of filter mat 44.

The end caps 40 include flanges 41 which are turned outwardly from the plane of the end caps 40 and welded or riveted onto the frame structure 32. A plurality of flexible retaining ribs 43 are secured to frame 32 at points along the side thereof to extend transversely across the face of the filter frame. The lower retainer strips 10' are secured to these ribs 43 by conventional means such as rivets and extend from one side of the frame to the other, across the base of the filter cell. The ends of the fibrous filter mat are subsequently secured within the aforedescribed slot therein. The end caps 40 are generally triangular- or trapezoidal-shaped sheet metal plates, corresponding substantially in size to the area defined by the edges of the filter screen 34. The upperwardly extending retainer strips 10' are positioned to simultaneously slip onto the side edges of filter screen 34 and the side edges of end caps 40 as illustrated in FIG. 3. This secures the backing screen 34 to the frame, and the structural portion of the frame is completed by placing the top caps 42 across the top of each cell, extending between pairs of end caps atop the bent portion of the V-shaped screen.

During the initial erection of the cell, the wire screen 34 is bent into shape and the lower edges of the legs of the V are secured by welding or other such means to the underside of frame 32. Then, as illustrated in FIG. 2, four lengths of conventional retaining strips 10' are secured to the ribs 43 to retain the lower edges of mat 40. The vertically extending retainer strips 10 of FIG. 1 are then secured in position to simultaneously slip onto the filter screen 34 and the side edges of end caps 40.

The final step in erecting the V-configuration cell before placing it over the air inlet to be put in use is the securing of the fibrous mat 44 over the filter screen 36. Any small, blunt-edged hand tool such as a paper wheel may be used to slip the edges of the mat 44 through the slotted opening between flanges 12 and 14 into the channel 11 of the retaining strips 10,10'. All edges of the mat are secured in this manner to prevent flapping or tearing during use. When necessary to change the mat or to remove it for any other purpose, it is a simple operation to pull the edges of the mat outwardly from the retaining strip. Although a dual-cell filter is illustrated in FIGS. 2 and 3, it is evident that various numbers of filter sections of a V-configuration can and may be used, depending on the size of the air flow path therethrough.

While preferred embodiments of the present invention have been illustrated and described, it is evident that further modifications could be made without departing from the scope of the invention, which is limited only by the following claims:

What is claimed is:

1. An improved elongated retainer strip for securing a fibrous filter mat and a backing screen to the supporting frame of a filter cell, wherein said elongated gripping strip is of the type generally having a base wall, a pair of side walls extending upwardly from each edge of said base wall and a downwardly and inwardly extending resilient semi-wall depending from the free end of each of said side walls terminating in spaced free edges to define a slot in opposing relationship to said base wall, wherein said improvement comprises:
   a. a first flange integrally depending from one edge of said base wall and extending in parallel, spaced relation to the outer surface of said base wall and defining a first longitudinally extending trackway between said flange and said base wall for receiving and retaining one of said backing screen and said supporting frame; and
   b. a second flange integrally depending from one edge of one of said side walls and extending in parallel, spaced relation to the outer surface of said one side wall and defining a second longitudinally extending trackway between said second flange and said one side wall for receiving and retaining the other of said supporting frame and said backing screen.

2. The retainer strip according to claim 1 wherein said second flange depends from said side wall at a point adjacent to the end of said base wall which forms, with said first flange, the opening to said first trackway.

* * * * *